March 14, 1933.  J. T. FETSCH, JR  1,901,741
HIGH FREQUENCY VOLTMETER
Filed Feb. 12, 1930
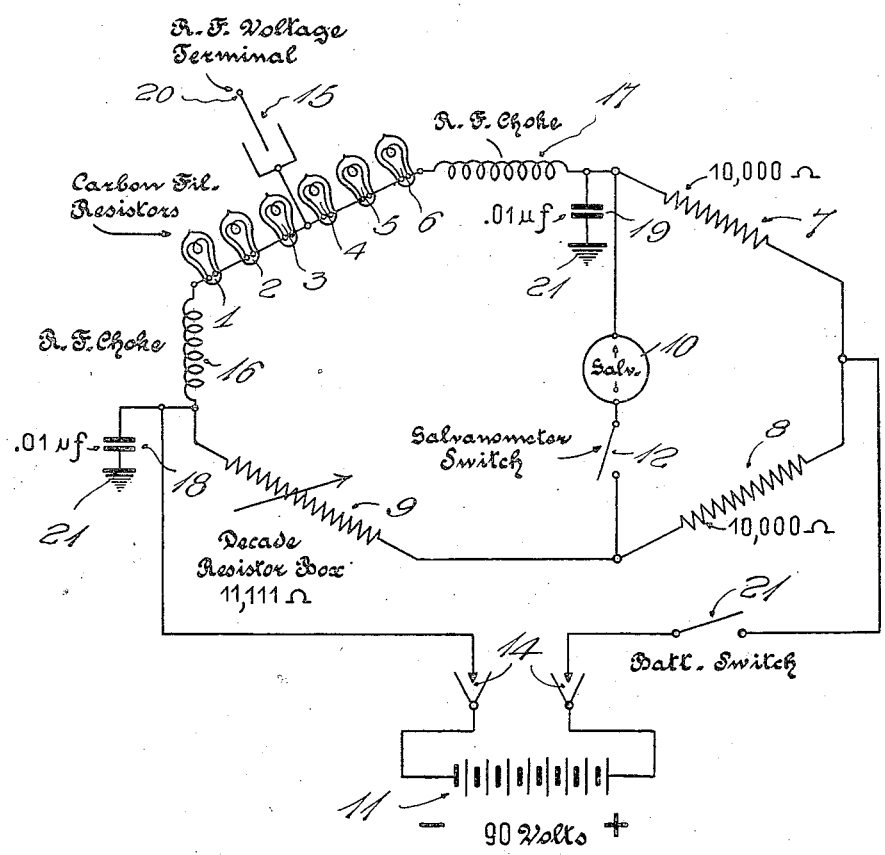
INVENTOR.
Joseph T. Fetsch, Jr.,
BY Harold Dodd
ATTORNEY.

Patented Mar. 14, 1933

1,901,741

UNITED STATES PATENT OFFICE

JOSEPH T. FETSCH, JR., OF WASHINGTON, DISTRICT OF COLUMBIA

HIGH FREQUENCY VOLTMETER

Application filed February 12, 1930. Serial No. 427,974.

My invention relates broadly to measuring apparatus and more particularly to a circuit arrangement for measuring alternating voltages of high frequency.

One of the objects of my invention is to provide a circuit arrangement for a high frequency voltmeter which is compact and light in weight and which does not require a sensitive calibrated observing instrument.

Another object of my invention is to provide a high frequency voltmeter covering a wide range of frequencies and which can be used to measure potentials of the order of fifty to one thousand volts depending upon the frequency of the voltage to be determined.

A further object of my invention is to provide a direct reading high frequency voltmeter which is accurate in its determination of relatively high potentials over a wide band of frequencies.

Other and further objects of my invention reside in the circuit arrangement for a high frequency voltmeter, as set forth more fully in the specification hereinafter following by reference to the accompanying drawing which diagrammatically illustrates the circuit arrangement in the high frequency voltmeter of my invention.

My invention is directed to a circuit arrangement for an apparatus for measuring alternating voltages of relatively high frequency. The apparatus includes a Wheatstone bridge in which one arm includes a resistance represented for purposes of illustrating my invention as a plurality of small carbon filament lamps 1, 2, 3, 4, 5, and 6, of high resistance, connected in series. Two of the opposite arms include fixed resistors 7 and 8, while the remaining arm contains a variable resistance 9, calibrated either in ohms or other desired units. With this latter arm the bridge is balanced under various impressed alternating voltages. To indicate balance, a sensitive indicating galvanometer 10 is included in the instrument. A battery 11 of suitable voltage is used to actuate the galvanometer 10 when the bridge is unbalanced and when push button switch 12 is depressed and connections 14 completed and switch 21 closed.

The apparatus of my invention is housed within a totally shielded box, and the arm containing the carbon filament lamps is separately shielded and isolated from the remainder of the bridge as far as radio frequency currents are concerned; although direct current is allowed to flow through it in order that the principle of the Wheatstone bridge may be utilized. This bridge arm consists of a number of high resistance carbon lamps 1—6 with their bases removed to cut down stray capacity. The radio frequency potential is introduced into the center of this arm through a minute coupling condenser 15 of approximately 1 or 2 micromicrofarads capacity more or less, depending on the voltage range and frequency desired. At the ends of this carbon lamp system 1—6 are radio frequency choke coils 16 and 17 beyond which are two .01 microfarad condensers 18 and 19. These choke coils 16 and 17 and condensers 18 and 19 are for isolating the radio frequency potentials from the remaining arms and parts of the bridge.

The bridge operates as follows: With an impressed radio frequency potential placed between the radio frequency voltage terminal 20 of the instrument and ground 21 which is the instrument shield, a certain very small radio frequency current flows through the coupling condenser 15. This current divides when it reaches the carbon filament lamp system 1—6. As it flows over the carbon filaments, they are heated slightly thereby lowering their resistance. The amount of change in resistance depends on the amount of radio frequency current flowing over these lamps, which in turn depends on the amount of impressed voltage. Therefore, the change in resistance of the carbon filament bridge arm 1—6 is a function of the radio frequency voltage impressed on the instrument terminals. A calibration is made of voltage against readings of a decade resistor box at 9. The manner in which the instrument is used is that the apparatus is balanced without any impressed voltage and the reading recorded. Then a voltage is impressed across terminal 20 and ground 21 and the bridge rebalanced and the reading noted. The change in resistance by virtue of the impressed voltage can then be ascertained. After the radio frequency current passes over the lamps 1—6, it flows to some extent through the choke coils 16—17 to and through the .01 microfarad bypass condensers 18—19 and thence to the shield or ground indicated at 21. Part of the current also flows through the stray capacity between the carbon lamp filaments and the shielding, therefore great care must be exercised in the construction of the instrument in making the stray capacities a minimum so as to permit greater sensitivity. The object is to have the radio frequency current travel all over the lamps, and be as nearly uniform as possible. This can be closely or nearly completely realized even at extremely high frequencies (16,000 kilocycles) if these lamps are selected with high resistance, fine carbon filaments, the bases removed, and small wires connecting the lamps. The framework which supports the lamps is as small as is practical. Under ordinary operating conditions, the resistance of incandescent electric lamps, such as carbon lamps, varies very considerably with temperature, and therefore with applied voltage. Carbon lamps have a negative temperature coefficient of resistance, that is, their resistance decreases with increase of temperature and hence with increase of applied voltage.

I have found that the high frequency voltmeter of my invention is highly practical in its construction and operation and that the apparatus holds its calibration better than the vacuum tube voltmeter and is not dependent upon precise values of any voltages such as filament supply and plate potential supply. The apparatus of my invention is extremely compact and light in weight. The apparatus requires no sensitive calibrated indicator instrument but utilizes an indicating galvanometer to show when a balance is obtained. Various potential ranges may be covered by varying the construction of the impedance element in the meter. By calibrating the dial on the variable resistance 9 directly in volts for a given frequency direct reading of various voltages for that frequency may be obtained according to the calibrations on the resistance 9.

While I have described my invention in one of its preferred embodiments I desire that it be understood that modifications may be made and that no limitations upon my invention are intended other than are imposed by the scope of the appended claims.

What I claim as new and desire to secure by Letters Patent of the United States is as follows:

1. A high frequency voltmeter comprising a Wheatstone bridge circuit including a multiplicity of arms, fixed resistance elements disposed in adjacent arms, a variable resistance calibrated for indicating different voltage values disposed in another arm of said Wheatstone bridge, a thermally variable resistance disposed in the other arm of said Wheatstone bridge and having terminals for the energization thereof by radio frequency currents for correspondingly changing the resistance thereof and effecting the balance of said Wheatstone bridge circuit, radio frequency choke coils disposed between said thermally variable resistance and the fixed and variable resistance elements in the other arms of said bridge, and a voltage source for normally energizing said Wheatstone bridge, said Wheatstone bridge circuit having an indicating device for determining the balanced or unbalanced condition of said Wheatstone bridge in accordance with the effect of radio frequency currents on said thermally variable resistance and in accordance with the adjustments on said variable resistance.

2. In a high frequency voltmeter, a Wheatstone bridge circuit having resistance elements of predetermined value connected in two of the arms of said Wheatstone bridge, a variable resistance device calibrated in accordance with voltage changes and connected in another arm of said Wheatstone bridge, resistance disposed in the adjacent arm of said Wheatstone bridge changeable in its effective value in accordance with impressed radio frequency potential, a mid-tap on said resistance, a radio feed path connected with said mid-tap, radio frequency choke coils connected between said last mentioned resistance and the other arms of said bridge and means actuated by the change in resistance in said last mentioned arm of said Wheatstone bridge for indicating an unbalance in said Wheatstone bridge, said means being balanced by changes in the effective value of said variable resistance device for indicating by the calibrations on said variable resistance device the effective voltage of the impressed radio frequency potential.

3. A high frequency voltmeter comprising a Wheatstone bridge circuit, a resistance disposed in one arm of said Wheatstone bridge and calibrated in accordance with voltage changes, a resistance connected in another arm of said Wheatstone bridge circuit, a mid-tap on said resistance, a radio frequency feed path connected with said mid-tap, said resistance being changeable in effective value in accordance with radio frequency potentials impressed through said radio frequency feed path for unbalancing a normally balanced condition of said Wheatstone bridge circuit, radio frequency choke coils connected between said changeable resistance and the other arms of said bridge, and an indicating meter disposed in said Wheatstone bridge circuit for indicating the extent of balance or unbalance of said Wheatstone bridge circuit, said first mentioned resistance being variable to restore said indicator to a position indicating a balanced condition of said Wheatstone bridge circuit for correspondingly indicating the effective voltage of the impressed radio frequency potential.

4. In a high frequency voltmeter, a Wheatstone bridge circuit comprising two pairs of arms, the arms of one of said pairs consisting of fixed resistances, one arm of said other pair consisting of an adjustable resistor, the other arm of said other pair consisting of a plurality of resistance elements of large temperature coefficient of resistance, a source of radio frequency potential, a radio frequency choke coil connected on each side of said resistance elements for confining the radio frequency path to said plurality of resistance elements, a source of direct current potential having its terminals respectively connected between the arms constituting each of said pairs across one pair of corners of said bridge, an indicating instrument having its terminals respectively connected across the other pair of corners of said bridge, a condenser having one terminal connected to one terminal of said source of radio frequency potential and having its other terminal connected to the electrical mid-point of the arm comprising said resistance elements of large temperature coefficient of resistance, the other terminal of said source of radio frequency potential being connected between the arm comprising said resistance elements of large temperature coefficient of resistance and said variable resistor.

5. In a high frequency voltmeter, a Wheatstone bridge circuit comprising two pairs of arms, the arms of one of said pairs consisting of fixed resistances, one arm of said other pair consisting of an adjustable resistor, the other arm of said other pair consisting of a plurality of resistance elements of negative temperature coefficient of resistance, a source of radio frequency potential, a radio frequency choke coil connected on each side of said resistance elements for confining the radio frequency path to said plurality of resistance elements, a source of direct current potential having its terminals respectively connected between the arms constituting each of said pairs across one pair of corners of said bridge, an indicating instrument having its terminals respectively connected across the other pair of corners of said bridge, a condenser having one terminal connected to one terminal of said source of radio frequency potential and having its other terminal connected to the electrical mid-point of the arm comprising said resistance elements of large temperature coefficient of resistance, the other terminal of said source of radio frequency potential being connected between the arm comprising said resistance elements of large temperature coefficient of resistance and said variable resistor.

6. In a high frequency voltmeter, a Wheatstone bridge circuit comprising two pairs of arms, the arms of one of said pairs consisting of fixed resistances, one arm of said other pair consisting of an adjustable resistor, the other arm of said other pair consisting of a plurality of resistance elements of large temperature coefficient of resistance, a source of radio frequency potential, a source of direct current potential having its terminals respectively connected between the arms constituting each of said pairs across one pair of corners of said bridge, an indicating instrument having its terminals respectively connected across the other pair of corners of said bridge, a condenser having one terminal connected to one terminal of said source of radio frequency potential and having its other terminal connected to the electrical mid-point of the arm comprising said resistance elements of large temperature coefficient of resistance, the other terminal of said source of radio frequency potential being connected between the arm comprising said resistance elements of large temperature coefficient of resistance and said variable resistor, and a radio frequency choke coil connected in series with each end of said arm consisting of a plurality of resistance elements of large temperature coefficient of resistance for excluding radio frequency currents from the other elements of said bridge.

7. In a high frequency voltmeter, a Wheatstone bridge circuit comprising two pairs of arms, the arms of one of said pairs consisting of fixed resistances, one arm of said other pair consisting of an adjustable resistor, the other arm of said other pair consisting of a plurality of resistance elements of large temperature coefficient of resistance, a source of radio frequency potential, a source of direct current potential having its terminals respectively connected between the arms constituting each of said pairs across one pair of corners of said bridge, an indicating instrument having its terminals respectively connected across the other pair of corners of said bridge, a condenser having one terminal connected to one terminal of said source of radio frequency potential and having its other terminal connected to the electrical mid-point of the arm comprising said resistance elements of large temperature coefficient of resistance, the other terminal of said source of radio frequency potential being connected between the arm comprising said resistance elements of large temperature coefficient of resistance and said variable resistor, and a radio frequency choke coil disposed in circuit with each end of said arm consisting of a plurality of resistance elements of large temperature coefficient of resistance for excluding radio frequency currents from the other elements of said bridge, each of said last mentioned resistance elements having a minimum value of stray capacity to the other elements of said bridge.

8. In a high frequency voltmeter, a Wheatstone bridge circuit comprising two pairs of arms, the arms of one of said pairs consisting of fixed resistances, one arm of said other pair consisting of an adjustable resistor, the other arm of said other pair consisting of a plurality of resistance elements of large temperature coefficient of resistance, a source of radio frequency potential, a radio frequency choke coil connected in series with each end of said last mentioned arm for confining the path of radio frequency current to said plurality of resistance elements, a source of direct current potential having its terminals respectively connected between the arms constituting each of said pairs across one pair of corners of said bridge, an indicating instrument having its terminals respectively connected across the other pair of corners of said bridge, a condenser having one terminal connected to one terminal of said source of radio frequency potential and having its other terminal connected to the electrical mid-point of the arm comprising said resistance elements of large temperature coefficient of resistance, the other terminal of said source of radio frequency potential being connected between the arm comprising said resistance elements of large temperature coefficient of resistance and said variable resistor, the resistance elements of large temperature coefficient of resistance being mounted for the maintenance of a current of substantially uniform value through each of said resistance elements.

9. In a high frequency voltmeter, a Wheatstone bridge circuit comprising two pairs of arms, the arms of one of said pairs consisting of fixed resistances, one arm of said other pair consisting of an adjustable resistor, the other arm of said other pair consisting of a plurality of resistance elements of large temperature coefficient of resistance, a source of radio frequency potential, a source of direct current potential having its terminals respectively connected between the arms constituting each of said pairs across one pair of corners of said bridge, an indicating instrument having its terminals respectively connected across the other pair of corners of said bridge, a condenser having one terminal connected to one terminal of said source of radio frequency potential and having its other terminal connected to the electrical mid-point of the arm comprising said resistance elements of large temperature coefficient of resistance, the other terminal of said source of radio frequency potential being connected between the arm comprising said resistance elements of large temperature coefficient of resistance and said variable resistor, and radio frequency choke coils connected in series with each terminal of the arm comprising resistance elements of large temperature coefficient for isolating the radio frequency currents in said arm from the other arms of said bridge.

10. In a high frequency voltmeter, a Wheatstone bridge circuit comprising two pairs of arms, the arms of one of said pairs consisting of fixed resistances, one arm of said other pair consisting of an adjustable resistor, the other arm of said other pair consisting of a plurality of incandescent electric lamps having fine filaments of large resistance and of large temperature coefficient of resistance, a source of radio frequency potential, a source of direct current potential having its terminals respectively connected between the arms constituting each of said pairs across one pair of corners of said bridge, an indicating instrument having its terminals respectively connected across the other pair of corners of said bridge, a condenser having one terminal connected to one terminal of said source of radio frequency potential and having its other terminal connected to the electrical mid-point of the arm comprising said resistance elements of large temperature coefficient of resistance, the other terminal of said source of radio frequency potential being connected between the arm comprising said resistance elements of large temperature coefficient of resistance and said variable resistor, and a radio frequency choke coil connected in series with each end of said last mentioned arm for limiting the path for radio frequency currents to said resistance elements of large temperature coefficient of resistance.

JOSEPH T. FETSCH, Jr.